Jan. 13, 1970 E. KENEZ 3,489,907
RADIATION SENSITIVE CARD DEALING APPARATUS USING DIGITAL CODE
Filed June 16, 1967 4 Sheets-Sheet 1
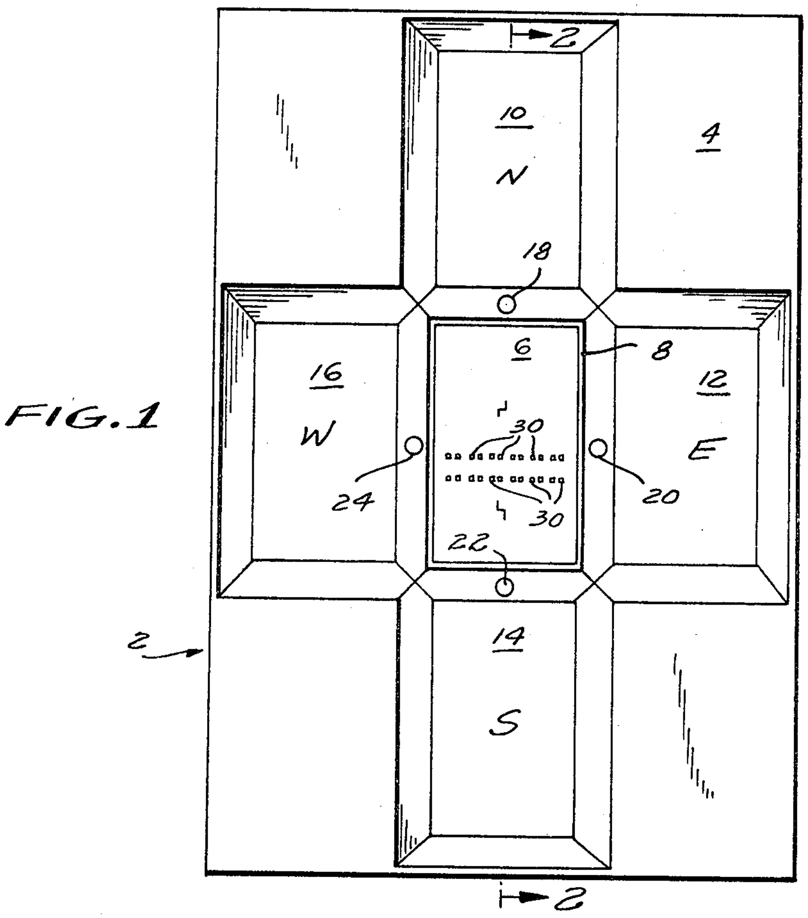
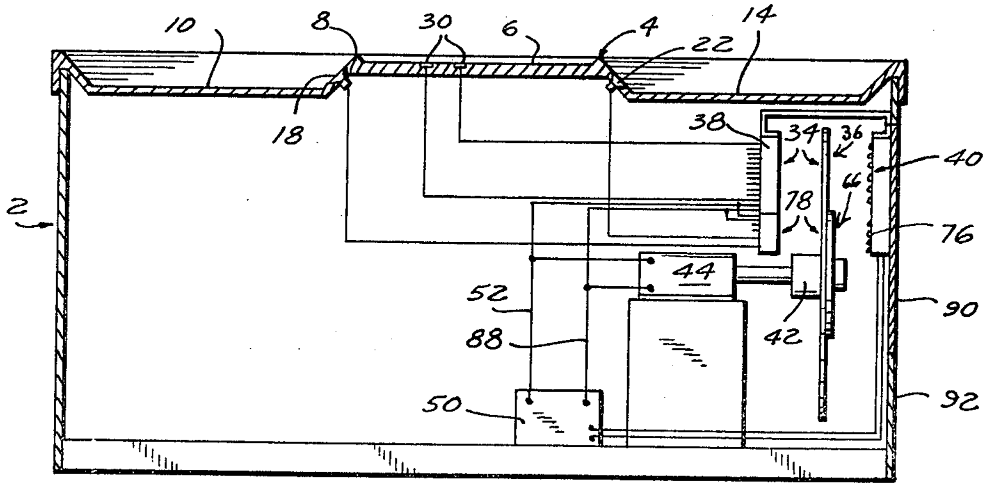
FIG. 2
INVENTOR
EDMUND KENEZ
BY James and Franklin
ATTORNEY Jan. 13, 1970 E. KENEZ 3,489,907

RADIATION SENSITIVE CARD DEALING APPARATUS USING DIGITAL CODE

Filed June 16, 1967 4 Sheets--Sheet 2

INVENTOR
EDMOND KENEZ
BY James and Franklin
ATTORNEY

INVENTOR
EDMUND KENEZ
BY James and Franklin
ATTORNEY

INVENTOR
EDMUND KENEZ
BY James and Franklin
ATTORNEY

United States Patent Office 3,489,907
Patented Jan. 13, 1970

3,489,907

RADIATION SENSITIVE CARD DEALING APPARATUS USING DIGITAL CODE

Edmund Kenez, 45 Marjorie Terrace, Englewood Cliffs, N.J. 07632

Filed June 16, 1967, Ser. No. 646,609
Int. Cl. G01n *21/30*
U.S. Cl. 250—219 5 Claims

ABSTRACT OF THE DISCLOSURE

The individual cards of a deck of playing cards are provided with conductive segments appropriately positioned in accordance with a predetermined binary code; the apparatus is provided with card-identifying means and with card-destination-determining means both of which carry appropriate indicia synchronously moved past operating stations therefor; when the card identifying indicia at the operating station therefore corresponds to the card then at the card sensing station an output signal is produced which actuates that one of the card destination means corresponding to the card destination indicia then at the appropriate operating station; the indicia carried by the card-identifying means and the destination-determining means are designed to cooperate with appropriately positioned photoelectric cells at the operating stations for the two means respectively.

The present invention relates to apparatus for ascertaining the identity of playing cards positioned at a card sensing station and determining where each card should be dealt in accordance with a predetermined schedule.

The invention is particularly well adapted, although not exclusively designed for, use in connection with the playing of bridge.

Ordinary bridge is played by dealing the cards of the deck into four hands, generally termed north, sourth, east and west, from a shuffled deck of playing cards. In this way the precise makeup of each dealt hand is a matter of chance. There are, however, many instances where it is desired that predetermined hands be dealt to the four players. This occurs quite frequently in competition, where the players in different teams all play the same hands, thereby to eliminate the effect of chance and make the outcome of the competition truly indicative of the relative skills of the players involved. Individual groups, for self-satisfaction or practice, often like to play the same hands as were used in a particular tournament. Also, the ordinary bridge player often encounters a particularly interesting hand which he would like to reproduce at will, either for purposes of review of the bidding or playing technique or so that he could expose his friends to the same game situation that he experienced.

It is of course possible to write down the makeup of each hand and then distribute the cards manually to the proper hand destinations, but this requires that someone actually look at the cards in order to determine where they should be dealt. The fact that this involves the possibility of human error is only one of its drawbacks. The visual dealing or distributing procedure, involving as it does the necessity for at least one person to see who gets which cards, limits the applicability of the procedure where small groups are concerned, since the person who thus visually deals the cards knows their distribution and thus is necessarily excluded from their play.

It is the prime object of the present invention to devise apparatus which will control the distribution of the playing cards in accordance with a predetermined schedule so as to produce bridge hands of predetermined content while keeping the identity of the playing cards of each hand unknown to all except the player who is to play them.

Apparatus capable of doing this has been known, but that apparatus has been complicated, expensive and unreliable. It is a prime object of the present invention to provide an apparatus of the type in question which avoids these drawbacks, and which is instead simple, inexpensive and highly reliable.

Another drawback of the prior art apparatus of the type involved is that it has not been readily amenable to individual programming. Those portions of the apparatus which determine the actual dealing or distribution of the cards were so designed, and so cooperated with the remainder of the apparatus, that they could not readily be programmed by the user of the device. Instead, if they were to be operative they had to be fabricated mechanically at some central location, such as the manufacturing source. It is a further prime object of the present invention to devise an apparatus of the type in question which need not be used only with destination determining means pre-programmed in accordance with predetermined hand distributions before they reach the user, but which also can be programmed by the user so as to reproduce particular hands which are of interest to that individual.

Thus the apparatus of the present invention is not only useable equally for large scale and small scale tournaments and small scale home or club versions of tournaments, but also can be used in the home or at a club to program games devised by or of interest only to the particular individuals involved.

The cards adapted to be used with the apparatus of the present invention are provided with identifying segments positioned thereon at selected positions in a plurality of pairs of potential positions in accordance with a binary coding, thereby greatly to simplify the identification of individual cards. When a card is placed face down at the card sensing station the identifying segments thereon are brought into registration with a plurality of contact means positioned on the apparatus so as to register with the aforementioned potential positions of the identifying segments on the cards. The contact means are connected in an electrical network, and the identifying segments on the cards are effective, in cooperation with the contact means, to define a particular conductive path through the network.

A card-identifying means is provided with a series of indicia arranged in sets corresponding to the binary coding for each of the cards of the deck and those sets are adapted to be moved past an operating station where the indicia carried thereby are sensed and compared with the locations of the identifying segments on the card. It is only when the indicia at the operating station correspond to the identifying segments on the card that the circuit through the identifying network is completed and that network has an output.

A separate card-destination-determining means is provided with indicia, one for each card in the deck, representing the destination desired for that particular card (north, sourth, east or west). This destination-determining means is moved in synchronism with the card-identifying means, so that each individual indicia on the destination-determining means is assocated with a particular set of indicia on the card-identifying means. Thus at the moment when the proper identifying indicia are at the operating station for the card-identifying means, thereby producing an output signal from the identifying network, the appropirate card destination indicia is at its operating station. The output from the card-identifying means is directed by the indicia then at the operating station for the destination-determining means to an appropriate card destination means, thus providing for the dealing of the identified card to the proper hand. The card destination means may itself take a wide variety of forms; it is here disclosed in simple form as a visual indicator, but it could, if desired, be any other type of indicator or could include means for mechanically engaging the card in question and delivering it to the appropriate destination.

In a preferred form here specifically disclosed the means at the operating stations for the card-identifying means and the destination-determining means adapted to cooperate with the indicia on the respective means are in the form of photo-electric cells, the indicia carried by the cooperating means controlling the transmission of light to the photoelectric cells in appropriate fashion so as to determine the selective energization of those cells. Most conveniently, the indicia are in the form of apertures appropriately located on the otherwise opaque card-identifying means and destination-determining means respectively. Through the use of photoelectric control of the type described a high degree of reliability is attained, since sliding contacts are entirely eliminated, and the local manual programming of the destination-determining means is greatly facilitated, since all that is required is to punch holes at desired and readily ascertained locations.

To the accomplishment of the above, and to such other objects as may hereinafter appear, the present invention relates to the construction and arrangement of card dealing apparatus as defined in the appended claims and as described in this specification, taken together with the accompanying drawings, in which:

FIG. 1 is a top plan view of an embodiment of the present invention;

FIG. 2 is a semi-schematic side cross sectional view thereof taken along the line 2—2 of FIG. 1;

Figure 3:
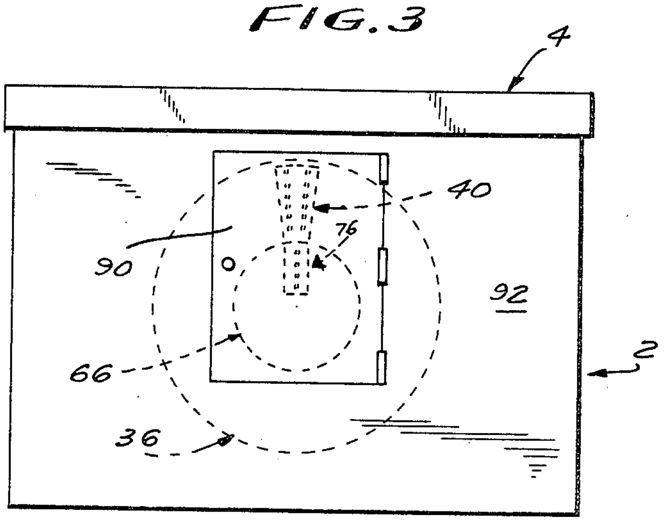
FIG. 3 is an end elevational view taken from the right hand end of FIG. 2.

The apparatus comprises a casing generally designated 2 having a top wall generally designated 4 provided with a raised tray section 6 defining the card sensing station. The tray section 6 may be provided with a surrounding rim 8 in order to ensure that when a playing card is placed therein it will be properly positioned. Disposed around the tray section 6 at the sides and ends thereof are card-receiving trays 10, 12, 14 and 16 respectively adapted to receive the cards corresponding, for example, to the desired north, east, south and west hands. Located between the sensing tray 6 and each of the card-receiving trays 10, 12, 14 and 16 respectively is a bulb 18, 20, 22 and 24 respectively, these bulbs collectively defining the individual card destination means of the apparatus. When a card is placed in the card sensing tray 6 one of the bulbs 18, 20, 22, 24 will light up to indicate the proper destination of that particular card. The cards are adapted to be placed face down, one after the other in any order, in the sensing tray 6. In the form here specifically disclosed they will then be manually transported, still face down, to the particular receiving tray 10, 12, 14, 16 indicated by the illumination of the corresponding bulb 18, 20, 22, 24. In this way the entire deck will be distributed into north, south, east and west hands in accordance with a predetermined dealing schedule without anyone knowing what cards are in which hand.

The cards adapted to be used with the apparatus of the present invention may be visually identical with conventional playing cards. They differ from conventional playing cards, however, in being provided with means thereon capable of being sensed by the apparatus and of indicating the individual identity of each card. As here specifically disclosed these means are in the form of identifying segments or strips 26*a–f* which are positioned on the card in a row each in one or another of a pair of potential positions. Thus, having reference to FIG. 4, which discloses as an example the ace of spades, each of the conductive segments 26*a–f* is located either in a lower position or an upper position as measured from the center line 28 of the card. For this partciular card, in the example here taken, the segment 26*a* is in the upper position while all of the segments 26*b–f* are in the lower position. The arrangement of the conductive segments 26 is duplicated on both sides of the card centerline 28 so that the apparatus will function without regard to the specific orientation of the card when it is placed in the sensing tray 6.

Figure 4:
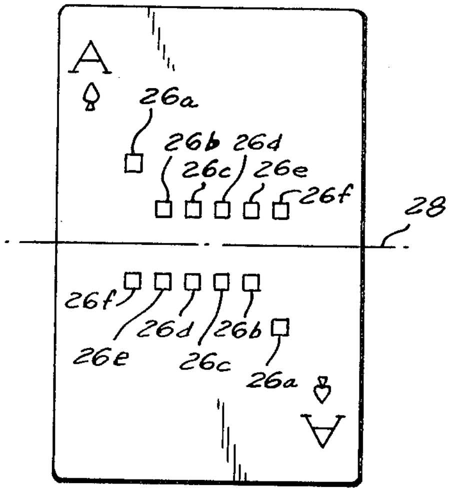
FIG. 4 is a face view of a typical playing card designed to be used with the apparatus.

It will be appreciated that by thus locating the conductive segments 26 a binary coding arrangement is produced in which, for purposes of identification, the lower position of the segment is designated 0 and the upper position is designated 1. Thus, considering that the ace of spades shown in FIG. 4 is placed face down on the sensing tray 6, its binary code will be 000001. The entire deck may be binary coded as follows:

| | |
|---|---|
| Spade: | |
| Ace | 000001 |
| Deuce | 000010 |
| Three | 000011 |
| Four | 000100 |
| Five | 000101 |
| Six | 000110 |
| Seven | 000111 |
| Eight | 001000 |
| Nine | 001001 |
| Ten | 001010 |
| Jack | 001011 |
| Queen | 001100 |
| King | 001101 |
| Heart: | |
| Ace | 001110 |
| Deuce | 001111 |
| Three | 010000 |
| Four | 010001 |
| Five | 010010 |
| Six | 010011 |
| Seven | 010100 |
| Eight | 010101 |
| Nine | 010110 |
| Ten | 010111 |
| Jack | 011000 |
| Queen | 011001 |
| King | 011010 |
| Diamond: | |
| Ace | 011011 |
| Deuce | 011100 |
| Three | 011101 |
| Four | 011110 |
| Five | 011111 |
| Six | 100000 |
| Seven | 100001 |
| Eight | 100010 |
| Nine | 100011 |
| Ten | 100100 |
| Jack | 100101 |
| Queen | 100110 |
| King | 100111 |

Club:

| | |
|---|---|
| Ace | 101000 |
| Deuce | 101001 |
| Three | 101010 |
| Four | 101011 |
| Five | 101100 |
| Six | 101101 |
| Seven | 101110 |
| Eight | 101111 |
| Nine | 110000 |
| Ten | 110001 |
| Jack | 110010 |
| Queen | 110011 |
| King | 110100 |

The apparatus is provided, at the sensing tray 6, with a plurality of pairs of contact members 30 exposed at the surface of the tray 6, each contact pair 30 being so located as to register with a potential position of the conductive segments 26 on the cards. As has been shown, each card has six conductive segments 26, with each conductive segment being located in one or another of two potential positions therefor, so that a total of twelve potential positions are involved. Consequently the apparatus is provided at the tray 6 with twelve correspondingly located pairs of contacts 30. When a card is placed on the tray 6 each of its conductive segments 26_a–f_ will register with and complete an electrical circuit between the contact pairs 30 corresponding thereto, the contact pairs 30 which do not correspond thereto remaining open-circuited.

Figure 7:
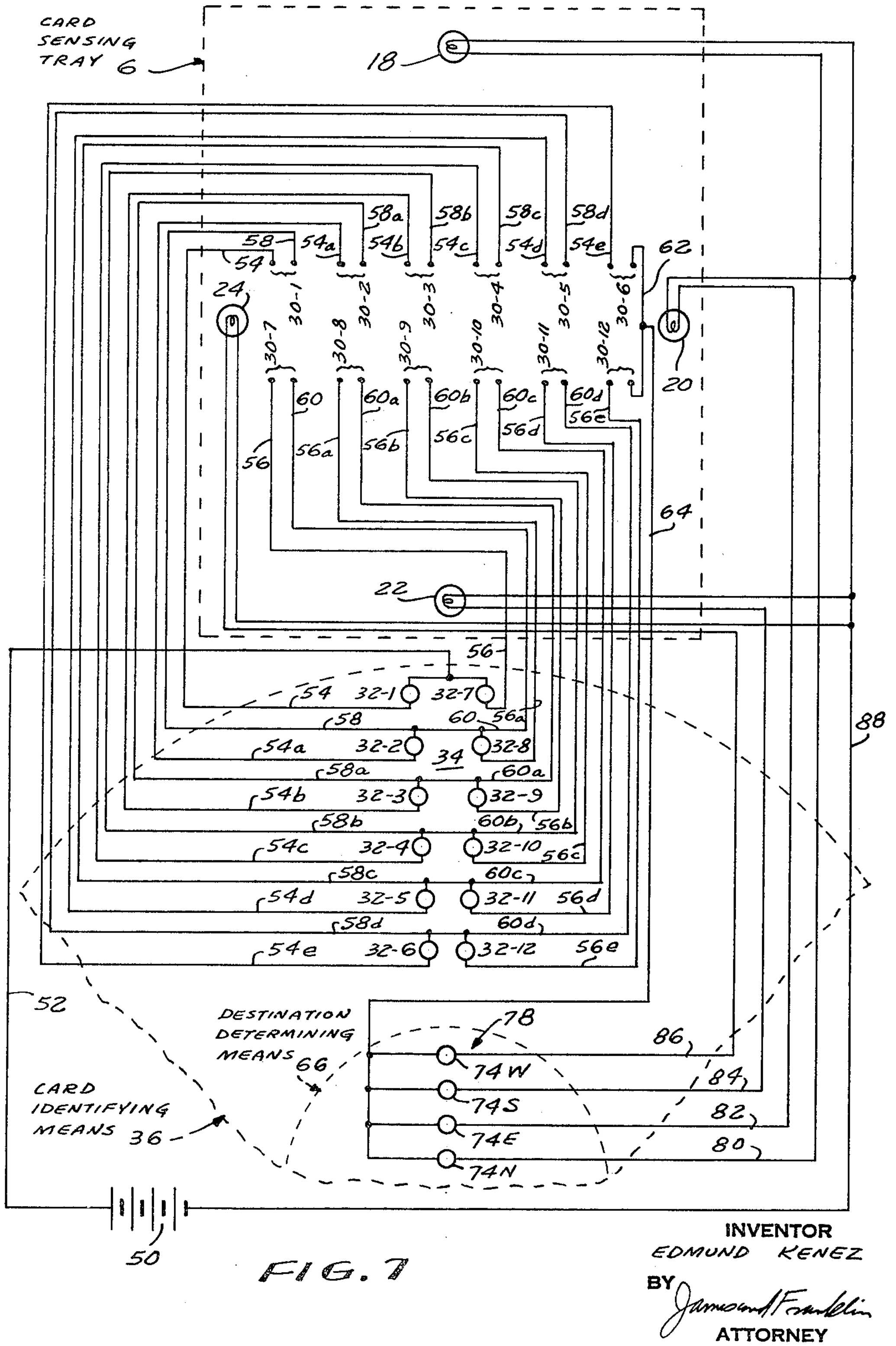
FIG. 7 is a schematic circuit diagram of the apparatus disclosed.

In the schematic circuit diagram of FIG. 7 the contact pairs in the "0" potential positions are designated 30–1 through 30–6 and the contact pairs of the "1" potential positions are designated 30–7 through 30–12 respectively. Each of these contact pairs is connected by appropriate leads to a set of twelve photoelectric cells 32–1 through 32–12 located at an operating station generally designated 34 for the card-identifying means generally designated 36. The photoelectric cells 32–1 through 32–12 are here specifically disclosed as of the type which normally have a high resistance but which become much more conductive when illuminated, thus functioning as normally open switches which are closed when illuminated. They are mounted on a support 38 (see FIG. 2) opposite one or more light sources 40. The card-identifying means 36 is in the form of a disk mounted in any appropriate manner on hub 42 and interposed between the photoelectric elements 32 and the light source 40 therefor. The hub 42 is adapted to be rotated by motor 44 so as to rotate the disk 36. That disk (see FIG. 5) is divided into fifty-two sectors 46, one for each of the fifty-two cards in the deck, and each of those sectors is divided circumferentially into a left hand section 46–1 and a right hand section 46–0, each of those sectors being further divided radially into six parts. Each radial part of a given sector 46 corresponds to a given pair of potential positions for the conductive segments 26 on the cards and to a corresponding given pair of contact members 30–1 and 30–7, 30–2 and 30–8 etc., which in turn correspond to the "1" and "0" binary code values. The photoelectric elements 32–1 through 32–12 are arranged in two converging rows so as to register with the corresponding radial and circumferential subdivisions of a given sector 46 when that sector is in the operating station 34. Thus the photoelectric elements 32–1 and 32–7 correspond respectively to the radially outermost divisions of the sector portions 46–1 and 46–0 respectively, the photoelectric elements 32–2 and 32–8 correspond respectively to the next radially inwardly located pairs of subdivisions of the sector portions 46–1 and 46–0, and so on.

The card-identifying means 36 is provided, in each sector 46, with six apertures 47, one in each of the six radial subdivisions of that sector and, in each such radial subdivision, either in section 46–0 or section 46–1 corresponding to the binary coding of the particular card to which that sector 46 relates. Each sector 46 is coded with the identifying indicia defined by those apertures so as to correspond to a different playing card of the deck in accordance with the binary code set forth above.

Thus when a given sector 46 is in the operating station 44 six of the photoelectric elements 32 will be illuminated through the identifying indicia apertures in that segment 46, while the other six photoelectric elements 32 will not be illuminated, since the opaque portion of the sector 46 will be interposed between them and the light source 40. Furthermore, the particular ones of the photoelectric elements 32 which will be thus illuminated will correspond to the predetermined binary code for a particular one of the fifty-two cards in the deck.

A battery or other source of electric power 50 has one end connected by lead 52 to one side of each of the photoelectric elements 32–1 and 32–7. The other sides of the photoelectric elements 32–1 and 32–7 are connected by leads 54 and 56 respectively to one of the contacts of pairs 30–1 and 30–7 respectively. The other contacts of pairs 30–1 and 30–7 respectively are connected by leads 58 and 60 respectively to one another and to the upper ends of photoelectric cells 32–2 and 32–8 respectively. The other sides of photoelectric elements 32–2 and 32–8 respectively are connected by leads 54_a_ and 56_a_ respectively to one of the contacts of pairs 30–2 and 30–8 respectively. The other sides of those contact pairs are connected by leads 58_a_ and 60_a_ to one another and to the upper ends of photoelectric elements 32–3 and 32–9, the lower ends of those elements are connected by leads 54_b_ and 56_b_ respectively to the first contacts of pairs 30–3 and 30–9 respectively, and so on, so as to define a card identifying network, the last contacts of pairs 30–6 and 30–12 being connected together by lead 62 to which output lead 64 is connected.

A circuit will be completed through the card-identifying network from the battery 50 to the output lead 64 only when the particular photoelectric elements 32 illuminated at any given moment correspond to the particular ones of the contact pairs 30 which are then bridged by the conductive segments 26 carried by the card then in the card sensing tray 6. Thus when a card is placed in the sensing tray 6 there will be no signal at the output lead 64 until the motor 44 has moved the card-identifying means 36 to a position in which the sector 46 corresponding to that particular card is at the operating station 34, that is to say, is interposed between the array of photoelectric cells 32 and the light source 40 therefor. Thus the card at the sensing station 6 is identified by the card-identifying means 36 in terms of the rotational position of the latter.

Figure 5:
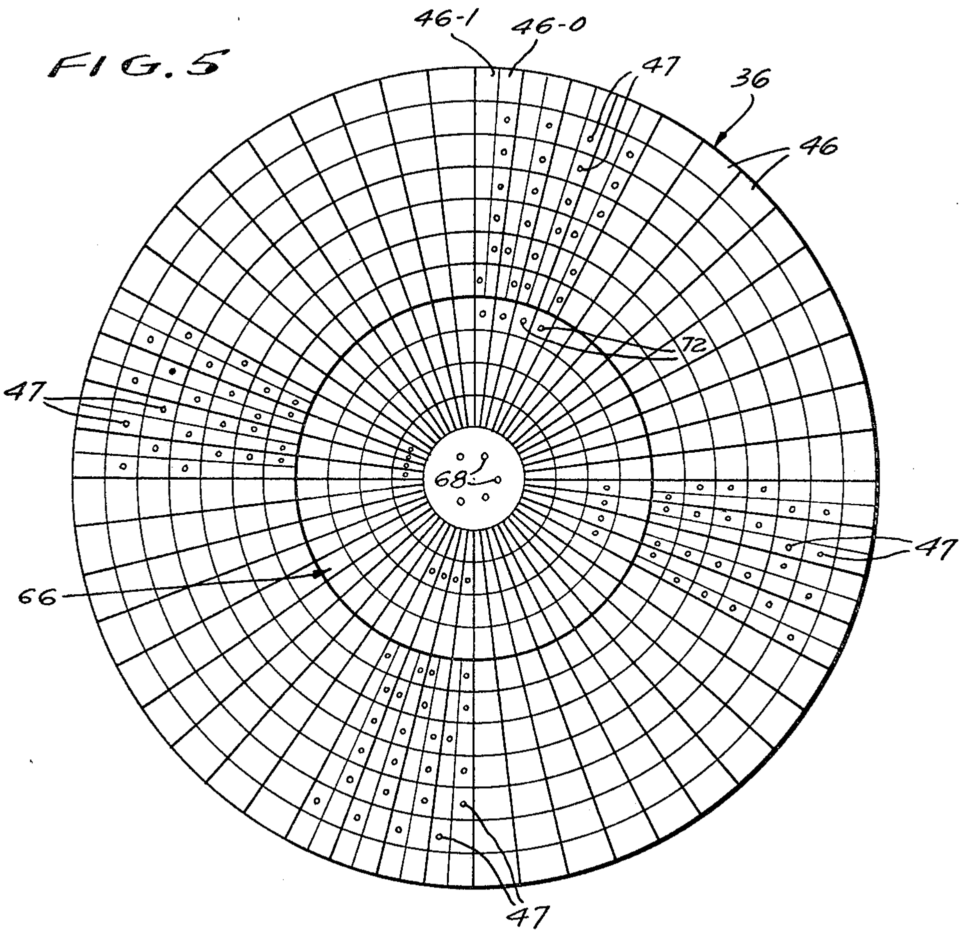
FIG. 5 is an elevational view of the card-identifying means and destination-determining means as they are adapted to be associated in use in the specific embodiment here disclosed, the indicia on those means being shown only for a limited number of cards for purposes of simplicity.
Figure 6:
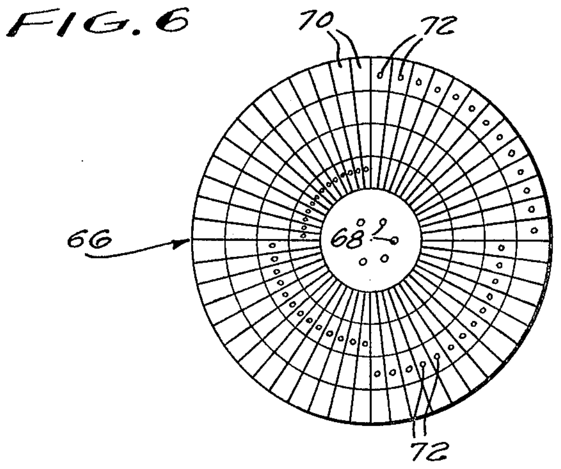
FIG. 6 is an elevational view of the destination-determining means alone, with the card-determining indicia being shown thereon for a complete deal in which each hand would be dealt thirteen cards of the same suit.

The destination-determining means, generally designated 66, may be constituted by a programming disk of a radial size such as to be received inside the annular card-identifying means 36, as is clearly indicated in FIG. 5. That programming disk 66 is separated from the card identifying means 36 but is adapted to be mounted on the hub 42 and rotated thereby in synchronism with the card-identifying means 36. This may readily be accomplished by providing the hub 42 with a plurality of asymmetrically located driving pins adapted to be received within the correspondingly asymmetrically located apertures 68 formed at the center of the card-identifying means 36 and the destination-determining means 66, that portion of the card identifying means 36 located behind the destination-determining means 66 being transparent. The operative portion of the destination-determining means 66 is divided into fifty-two sectors 70, one for each of the cards in the deck, these sectors 70 being adapted to register rotationally with the corresponding sectors 46 on the card-identifying means 36. Each of the sectors 70 is subdivided into four radially displaced sections each corresponding to a desired hand destination for the cards. As here specifically disclosed the radial subdivision of the sectors 70, moving radially outwardly, correspond to the north, east, south and west hands respectively. The card destination indicia on the destination-determining means 66 are in the form of light transmissive apertures 72, one for each sector 70, located in the appropriate radial section corresponding to the desired hand destination for that particular card. As shown in FIG. 6 the apertures 72 are formed in the disk 66 so as to program a deal in which the north hand will receive thirteen spades, the east hand will receive thirteen hearts, the south hand will receive thirteen diamonds and the west hand will receive thirteen clubs.

When the programming disk 66 is mounted on the hub 42 it is interposed between a series of four photoelectric elements 74W, 74S, 74E and 74N, mounted in a vertical row, and one or more light sources 76 for the photoelectric elements 74, thereby defining an operating station 78 for the destination-determining means 66. The photoelectric elements 74, like the elements 32, are normally nonconductive but become conductive when illuminated.

Referring now to the circuit diagram of FIG. 7, it will be seen that the output lead 64 from the card identifying network is connected to one side of each of the photoelectric elements 74N, 74E, 74S and 74W, the other sides of the elements being connected by leads 80, 82, 84 and 86 respectively to the individual bulbs 18, 20, 22 and 24 respectively defining the card destination means, the other sides of those bulbs being electrically connected by lead 88 to the battery 50.

Hence it will be apparent that whenever the card-identifying means 36 has identified the card in the card sensing tray 6, thereby producing an output signal on output lead 64, that signal will be transmitted to a selected one of the bulbs 18, 20, 22, 24 as determined by the location of the aperture 72 in that segment 70 of the destination-determining means 66 which is then in its operating station 78, that particular aperture 72 illuminating the appropriate one of the photoelectric elements 74 so as to close a circuit therethrough and thus energize the appropriate bulb 18, 20, 22, 24.

The user of the device, thus apprised of the proper destination for the particular card then in the tray 6, will slide that card face down into the appropriate card-receiving tray 10, 12, 14, 16, and he will then place the next card face down in the card-receiving tray 6. The motor 44 may be energized during the entire period that cards are being identified and dealt, thus continuously rotating the card-identifying means 36 and the destination-determining means 66 in synchronism, those means always being ready to identify a card and indicate its proper destination, in accordance with the programming on the destination-determining disk 66.

The card-identifying means 36 is used for all programmed deals, since it functions solely to identify the cards. Thus it constitutes a fixed part of the apparatus which may be more or less permanently attached to the hub 42. Only the destination-determining means 66 need be changed from one deal to another. It therefore is adapted to be removably attached to the hub 42 in any appropriate manner, and may be made accessible by providing a door 90 in an end wall 92 of the casing 2 opposite the programming disk 66.

The simplicity of the programming disk 66, involving fifty-two segments 70 divided into four radially spaced sections, greatly facilitates the programming of the apparatus. Since each segment 70 corresponds to a different card, the identity of that card may be printed or otherwise visibly indicated in each segment 70. All that need be done to complete the programming is to punch a hole 72 in that one of the four radially spaced sections of a given segment 70 corresponding to the desired destination of the card. Thus blank or unpunched programming disks 66 can be furnished to individual users for "do it yourself" programming of particularly interesting Bridge hands, which are then permanently recorded and may be redistributed and replayed at any time.

It is noteworthy that the identifying and distributing functions of the apparatus are performed without having to use any sliding contacts or, indeed, any sliding engagements of any kind. Thus the reliability, accuracy and longevity of the apparatus is maximized.

The segments 26 on the cards have been here specifically designated as conductive and they have been here shown as adapted to substantially engage and conductively bridge the contact pairs 30. It will be understood that this specific disclosure is exemplary only, and that other specific means could be employed carried by the cards and located at the sensing station, which will complete or establish the appropriate electrical circuits. For example, the segments 26 could be magnetic and the means 30 could be in the form of magnetically sensitive switches, or the segments 26 could be capacitively coupled to the contact means 30 in conjunction with the use of an alternating current energy source. These variations are but typical of many which could be employed, all to the end that segments 26 carried by the cards would coact with the individual means 30 at the card sensing station 6 so as to selectively establish the appropriate circuits in the card identifying network.

While but a single embodiment of the present invention has been here disclosed, in particular one which calls for manual positioning of the cards individually in the sensing station 6 and manual transfer of the cards to the appropriate receiving tray 10–16 in response to a visual signal to produce Bridge hands, it will be apparent that many variations may be made therein, with regard to the manner in which cards are presented to the sensing station 6 and removed therefrom, whether that presentation and removal be accomplished manually or mechanically, with regard to the specific instrumentalities and interconnections of instrumentalities involved in card identification and in card destination indication, and with regard to the specific game and type of card distribution, all without departing from the spirit of the invention as defined in the following claims.

I claim:

1. Card dealing apparatus for use with cards having means thereon to indicate their identity, said apparatus comprising a card sensing station, motor means, card identifying means operatively connected to said motor means so as to be moved thereby and having a series of card-identifying indicia moved therewith to and past an operating station therefor, means operatively connecting to said sensing station the active indicia located at a given moment at said operation station, destination-determining means operatively connected to said motor means so as to be moved thereby in synchronism with said card identifying means and having a series of card destination indicia thereon corresponding respectively to the card identifying indicia on said card identifying means and moved therewith to and past an operating station therefor, individual card destination means, a source of actuating power, and means for operatively connecting said power source to a given card destination means corresponding to the active card destination indicia located at a given moment at the operation station therefor to actuate said card destination means only when said active card identifying indicia corresponds to the identity of the card at said card sensing station, in which said identity indicating means on said card comprises a plurality of identifying segment means located in one of each pair of potential positions arranged in a plurality of pairs, said card sensing station comprising an array of contact means each adapted to register with a corresponding one of said potential positions when a card is placed at said sensing station, said identifying segment means being effective to complete a circuit through the contact means registering therewith, said segment means in said positions of said pairs of potential positions defining a binary coded identification of said card, and said card identifying means is operatively electrically connected to said contact means and to said power source in a card identifying network and is effective to produce an output from said network only when said card at said sensing station has its segment means in registration with the contact means corresponding to said active card identifying indicia, said means for operatively connecting said power source to said card distribution means comprising means to connect the output from said network to a given card destination means in accordance with the then active card destination indicia, and in which said card identifyng means comprises a substantially opaque element with light-transmissive areas located thereon at selected ones of potential predetermined locations and comprising said card identifying indicia, the operative connection between said indicia and said sensing station comprising a plurality of photoelectric elements located at said operating station for said card identifying means, said elements being electrically connected in said card identifying network between said source of power and said contact means at said sensing station and located corresponding to said potential locations so as to be operatively affected by the presence or absence of said light-transmissive areas at said potential locations.

2. The apparatus of claim 1, in which said destination-determining means comprises a substantially opaque element with light-transmissive areas located thereon at selected ones of potential predetermined locations and comprising said card destination indicia, said means connecting said power source to said card destination means comprising a plurality of photoelectric elements located at said operating station for said destination-determining means, said elements being electrically connected between said power source and a given card destination means and located corresponding to said potential locations so as to be affected by the presence or absence of said light-transmissive areas at said potential locations.

3. The apparatus of claim 2, there being for each card four of said potential locations in said destination-determining means, one location for each destination, only one of said potential locations being occupied by a light-transmissive area, said photoelectric elements located at said operating station for said destination-determining means comprising one such element for each destination.

4. Card dealing apparatus for use with cards having means thereon to indicate their identity, said apparatus comprising a card sensing station, motor means, card identifying means operatively connected to said motor means so as to be moved thereby and having a series of card-identifying indicia moved therewith to and past an operating station therefor, means operatively connecting to said sensing station the active indicia located at a given moment at said operating station, destination-determining means operatively connected to said motor means so as to be moved thereby in synchronism with said card identifying means and having a series of card destination indicia thereon corresponding respectively to the card identifying indicia on said card identifying means and moved therewith to and past an operating station therefor, individual card destination means, a source of actuating power, and means for operatively connecting said power source to a given card destination means corresponding to the active card destination indicia located at a given moment at the operating station therefor to actuate said card destination means only when said active card identifying indicia corresponds to the identity of the card at said card sensing station, in which said identity indicating means on said card comprises a plurality of identifying segment means located in one of each pair of potential positions arranged in a plurality of pairs, said card sensing station comprising an array of contact means each adapted to register with a corresponding one of said potential positions when a card is placed at said sensing station, said identifying segment means being effective to complete a circuit through the contact means registering therewith, said segment means in said positions of said pairs of potential positions defining a binary coded identification of said card, and said card identifying means is operatively electrically connected to said contact means and to said power source in a card identifying network and is effective to produce an output from said network only when said card at said sensing station has its segment means in registration with the contact means corresponding to said active card identifying indicia, said means for operatively connecting said power source to said card distribution means comprising means to connect the output from said network to a given card destination means in accordance with the then active card destination indicia, and in which said destination-determining means comprises a substantially opaque element with light-transmissive areas located thereon at selected ones of potential predetermined locations and comprising said card destination indicia, said means connecting said power source to said card destination means comprising a pluraltiy of photoelectric elements located at said operating station for said destination-determining means, said elements being electrically connected between said power source and a given card destination means and located corresponding to said potential locations so as to be affected by the presence or absence of said light-transmissive areas at said potential locations.

5. The apparatus of claim 4, there being for each card four of said potential locations in said destination-determining means, one location for each destination, only one of said potential locations being occupied by a light-transmissive area, said photoelectric elements located at said operating station for said destination-determining means comprising one such element for each destination.

References Cited

UNITED STATES PATENTS

| | | | |
|---|---|---|---|
| 2,051,615 | 8/1936 | Miles | 273—149 |
| 2,993,595 | 7/1961 | Dickinson et al. | 250—219 X |
| 3,222,071 | 12/1965 | Lang | 273—149 |
| 3,312,473 | 4/1967 | Friedman et al. | 273—149 |

WALTER STOLWEIN, Primary Examiner

U.S. Cl. X.R.

273—149